United States Patent
Hayes et al.

(10) Patent No.: US 11,797,415 B2
(45) Date of Patent: Oct. 24, 2023

(54) APPARATUS AND METHOD FOR MONITORING EVENTS IN A DATA PROCESSING SYSTEM

(71) Applicant: Arm Limited, Cambridge (GB)

(72) Inventors: Timothy Hayes, Cambridge (GB); Giacomo Gabrielli, Cambridge (GB); Matthew James Horsnell, Cambridge (GB)

(73) Assignee: Arm Limited, Cambridge (GB)

( * ) Notice: Subject to any disclaimer, the term of this patent is extended or adjusted under 35 U.S.C. 154(b) by 234 days.

(21) Appl. No.: 17/271,399

(22) PCT Filed: Aug. 30, 2019

(86) PCT No.: PCT/GB2019/052428
§ 371 (c)(1),
(2) Date: Feb. 25, 2021

(87) PCT Pub. No.: WO2020/070465
PCT Pub. Date: Apr. 9, 2020

(65) Prior Publication Data
US 2021/0342248 A1 Nov. 4, 2021

(30) Foreign Application Priority Data
Oct. 3, 2018 (GB) ..................................... 1816147

(51) Int. Cl.
*G06F 11/34* (2006.01)
*G06F 11/30* (2006.01)
(52) U.S. Cl.
CPC ...... *G06F 11/3452* (2013.01); *G06F 11/3024* (2013.01); *G06F 11/3466* (2013.01)
(58) Field of Classification Search
CPC ............. G06F 11/3024; G06F 11/3072; G06F 11/3409; G06F 11/3452; G06F 11/3466;
(Continued)

(56) References Cited

U.S. PATENT DOCUMENTS 4,800,562 A   1/1989 Hicks
5,436,914 A   7/1995 Augustine et al.
(Continued)

FOREIGN PATENT DOCUMENTS

WO   99/34289      7/1999
WO   2005/119428   12/2005

OTHER PUBLICATIONS

International Search Report and Written Opinion of the ISA for PCT/GB2019/052428, dated Dec. 19, 2019, 17 pages.
(Continued)

*Primary Examiner* — John H Le
(74) *Attorney, Agent, or Firm* — NIXON & VANDERHYE P.C.

(57) ABSTRACT

An apparatus and method are provided for monitoring events in a data processing system. The apparatus has first event monitoring circuitry for monitoring occurrences of a first event within a data processing system, and for asserting a first signal to indicate every m-th occurrence of the first event, where m is an integer of 1 or more. In addition second event monitoring circuitry is used to monitor occurrences of a second event within the data processing system, and to assert a second signal to indicate every n-th occurrence of the second event, where n is an integer of 1 or more. History maintenance circuitry then maintains event history information which is updated in dependence on the asserted first and second signals. Further, history analysis circuitry is responsive to an analysis trigger to analyse the event history information in order to detect a reporting condition when the event history information indicates that a ratio between occurrences of the first event and the occurrences of the second event is outside an acceptable range. The history analysis circuitry is then responsive to detection of the reporting condition to assert a report signal. This provides a (Continued)

particularly efficient and effective mechanism for monitoring ratios of events within a data processing system.

20 Claims, 11 Drawing Sheets

(58) Field of Classification Search
CPC ............ G06F 11/3476; G06F 2201/81; G06F 2201/86; G06F 2201/88
USPC ........................................................ 702/182
See application file for complete search history.

(56) References Cited

U.S. PATENT DOCUMENTS

| | | | |
|---|---|---|---|
| 5,937,437 | A | 8/1999 | Roth et al. |
| 7,228,472 | B2 * | 6/2007 | Johnson ............. G01R 31/3177 |
| | | | 714/724 |
| 7,509,539 | B1 * | 3/2009 | Denefleh ............... G06F 11/079 |
| | | | 714/48 |
| 8,731,688 | B2 * | 5/2014 | Yamazaki ........... G06F 11/3476 |
| | | | 711/E12.001 |
| 2005/0144532 | A1 | 6/2005 | Dombrowa et al. |
| 2005/0155020 | A1 | 7/2005 | DeWitt, Jr. et al. |
| 2005/0188276 | A1 | 8/2005 | Hunter et al. |
| 2010/0242025 | A1 * | 9/2010 | Yamazaki ............ G05B 19/042 |
| | | | 711/E12.001 |
| 2014/0013020 | A1 * | 1/2014 | Horsnell ............. G06F 11/3476 |
| | | | 710/260 |
| 2016/0062810 | A1 | 3/2016 | Von Wendorff |
| 2017/0220447 | A1 | 8/2017 | Brandt |

OTHER PUBLICATIONS

Search and Examination Report for GB1816147.1, dated Apr. 4, 2019, 7 pages.
Examination Report for GB1816147.1. dated Dec. 21, 2020, 3 pages.
Office Action for EP Application No. 19763064.3 dated Aug. 1, 2022, 10 pages.
Office Action for JP Application No. 2021-510645 dated Jun. 30, 2023 and English translation, 4 pages.
Office Action for CN Application No. 201980055717.7 dated Aug. 1, 2023 and English translation, 27 pages.

* cited by examiner

APPARATUS AND METHOD FOR MONITORING EVENTS IN A DATA PROCESSING SYSTEM

This application is the U.S. national phase of International Application No. PCT/GB2019/052428 filed 30 Aug. 2019, which designated the U.S. and claims priority to GB Patent Application No. 1816147.1 filed 3 Oct. 2018, the entire contents of each of which are hereby incorporated by reference.

The present technique relates to an apparatus and method for monitoring events in a data processing system.

It is known to provide a data processing system with performance monitoring circuitry for generating performance monitoring data indicative of processing performance of the data processing system. For example, the performance monitoring circuitry may count occurrences of an event occurring within the data processing system, such as the execution of an instruction or a cache miss. An interrupt may be generated when the counter reaches a given value, so that when a performance issue arises, such as a large number of cache misses, then the processing system may be triggered to perform a given operation based on the performance monitoring data, for example an operation to address the performance issue identified by the performance monitoring data.

The performance monitoring circuitry may maintain separate event counts for multiple events. It would be desirable in some instances to be able to efficiently and reliably monitor ratios of events when monitoring performance within a data processing system.

In one example arrangement, there is provided an apparatus comprising: first event monitoring circuitry to monitor occurrences of a first event within a data processing system, and to assert a first signal to indicate every m-th occurrence of the first event, where m is an integer of 1 or more; second event monitoring circuitry to monitor occurrences of a second event within the data processing system, and to assert a second signal to indicate every n-th occurrence of the second event, where n is an integer of 1 or more; history maintenance circuitry to maintain event history information which is updated in dependence on the asserted first and second signals; and history analysis circuitry responsive to an analysis trigger to analyse the event history information to detect a reporting condition when the event history information indicates that a ratio between the occurrences of the first event and the occurrences of the second event is outside an acceptable range; wherein the history analysis circuitry is responsive to detection of the reporting condition to assert a report signal.

In a further example arrangement, there is provided a method of monitoring events in a data processing system, comprising: monitoring occurrences of a first event within the data processing system, and asserting a first signal to indicate every m-th occurrence of the first event, where m is an integer of 1 or more; monitoring occurrences of a second event within the data processing system, and asserting a second signal to indicate every n-th occurrence of the second event, where n is an integer of 1 or more; employing history maintenance circuitry to maintain event history information which is updated in dependence on the asserted first and second signals; responsive to an analysis trigger, employing history analysis circuitry to analyse the event history information to detect a reporting condition when the event history information indicates that a ratio between the occurrences of the first event and the occurrences of the second event is outside an acceptable range; and asserting a report signal in response to detection of the reporting condition.

In a still further example arrangement, there is provided an apparatus comprising: first event monitoring means for monitoring occurrences of a first event within a data processing system, and for asserting a first signal to indicate every m-th occurrence of the first event, where m is an integer of 1 or more; second event monitoring means for monitoring occurrences of a second event within the data processing system, and for asserting a second signal to indicate every n-th occurrence of the second event, where n is an integer of 1 or more; history maintenance means for maintaining event history information which is updated in dependence on the asserted first and second signals; and history analysis means for analysing, in response to an analysis trigger, the event history information to detect a reporting condition when the event history information indicates that a ratio between the occurrences of the first event and the occurrences of the second event is outside an acceptable range; wherein the history analysis means is responsive to detection of the reporting condition to assert a report signal.

The present technique will be described further, by way of illustration only, with reference to examples thereof as illustrated in the accompanying drawings, in which:

FIG. 1 schematically illustrates a data processing system having performance monitoring circuitry;

Figure 1:
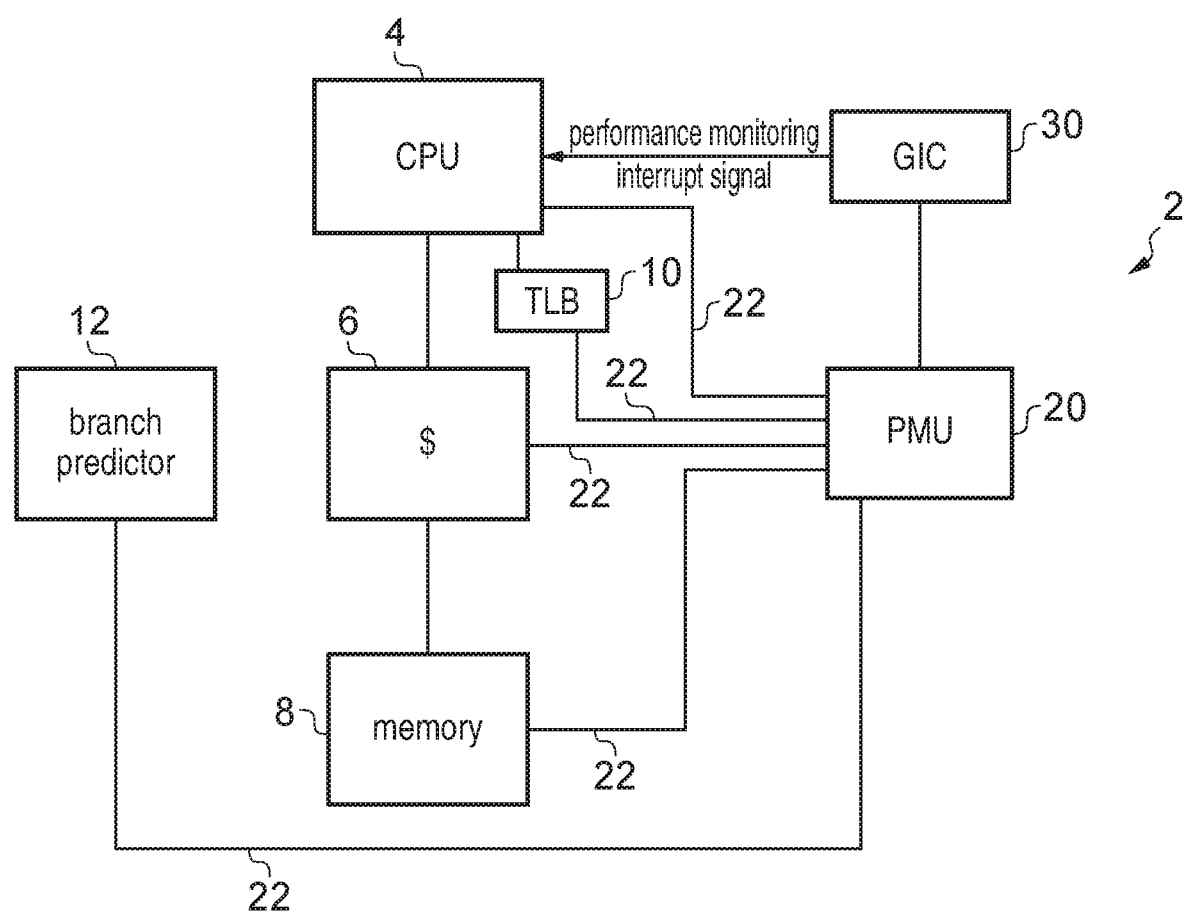

As mentioned earlier, it would be desirable in some instances to be able to efficiently and reliably monitor ratios of events when monitoring performance within a data processing system. US 2014/0013020 describes a system that can maintain separate event counts for multiple events, where a ratio of the event count for two events can be determined at a particular point in time, with an exception being triggered if the ratio exceeds a desired level. It can be useful to consider ratios of events when using performance monitoring, since such information may for example be used to make dynamic system configuration changes to better match an application's runtime behaviour. However, the above-described technique only allows the ratio analysis to be performed at restricted discrete points in time. In particular, at the point a first event count reaches a threshold, it is then determined whether a second event count has also reached its threshold, and if so an exception trigger can be issued. However, if that is not the case, then both counters are reset. Accordingly, it will be appreciated that the above technique requires the ratio to be exceeded within discrete bounded intervals. Whilst such an approach can provide a simple mechanism for checking ratios that can be useful in a variety of situations, it can lead to certain situations where the ratio is never detected as being exceeded, due to the denominator reaching its critical value across bounded intervals.

The techniques described herein provide an improved mechanism for analysing ratios of events during performance monitoring within a data processing system.

In an example arrangement, an apparatus is provided for performing performance monitoring within a data processing system. The apparatus has first event monitoring circuitry for monitoring occurrences of a first event within a data processing system and for asserting a first signal to indicate every m-th occurrence of the first event, where m is an integer of one or more. Further, second event monitoring circuitry is used to monitor occurrences of a second event within the data processing system, and for asserting a second signal to indicate every n-th occurrence of the second event, where n is an integer of one or more. Further, history maintenance circuitry is provided to maintain event history information which is updated in dependence on the asserted first and second signals.

History analysis circuitry is then responsive to an analysis trigger to analyse the event history information in order to detect a reporting condition when the event history information indicates that a ratio between the occurrences of the first event and the occurrences of the second event is outside an acceptable range. The history analysis circuitry can then be arranged on detection of the reporting condition to assert a report signal. The report signal can then be used, for example, to determine whether it is appropriate to assert an exception signal to an interrupt controller.

In accordance with the above described technique, rather than seeking to assess whether a ratio has been exceeded at a particular discrete point in time, for example when a first event count has reached a predetermined level, the use of the event history information enables a continuous monitoring of the desired ratio to be performed, hence alleviating the constraints of the technique discussed earlier. In accordance with the described technique, event history information is maintained on an ongoing basis by the history maintenance circuitry in dependence on the asserted first and second signals by the first and second event monitoring circuits. Each time an analysis trigger is received, that event history information is then analysed in order to detect situations where the ratio has exceeded an acceptable range. This provides an effective mechanism for ongoing monitoring of the ratio of occurrences of the two events, thereby providing significant improvements with regards to real-time monitoring of the performance of the system in which the above described apparatus is employed.

There are a number of ways in which the history analysis circuitry may determine when the ratio is outside of the acceptable range. However, in one example arrangement the history analysis circuitry is arranged to detect that the ratio is outside the acceptable range when the event history information indicates that the ratio has reached a chosen threshold. The acceptable range could be encoded by upper and lower thresholds if desired, but in one implementation the chosen threshold may be identified by a single threshold value, with the other end of the range being inferred, for example a logic 0 value. The chosen threshold can be identified in a variety of ways, for example using integer values or fractional values as desired.

The analysis trigger used to cause the history analysis circuitry to analyse the event history information can take a variety of forms. However, in one example the analysis trigger is generated each time the event history information is updated. This hence allows a continuous monitoring of the ratio of interest, ensuring that the ratio can be reassessed each time information is generated that may affect the ratio.

The history maintenance circuitry can take a variety of forms, but in one example implementation comprises a history storage having a plurality of entries, where each entry is arranged to store an item of history data, and where each item of history data indicates an assertion of the first signal or an assertion of the second signal. Hence, the individual items of history data within the history storage identify individual assertions of the first signal or the second signal, with that information then being used to analyse the ratio of occurrences of the first event and the second event.

In one example implementation, the history maintenance circuitry further comprises update circuitry arranged to receive the first signal and the second signal and to cause the history storage to be updated dependent on the received first and second signals.

The update circuitry may operate in a variety of ways. For example, it may cause the history storage to be updated each time the first signal or the second signal is asserted. However, as will be discussed later herein, in one example implementation, it may in some specific scenarios not cause an update to take place when the first and second signals are asserted. In particular, a significant simplification in the apparatus can be achieved if updates are excluded when both the first and second signals are asserted at the same time. Whilst this could potentially lead to a loss of some information, this can be largely mitigated by choosing values of m and n that are not multiples of each other.

The history storage can be organised in a variety of ways, but in one example implementation it is arranged as a shift register comprising p entries, and is responsive to an update trigger from the update circuitry to add a new item of history data to a head entry in the shift register.

In such an implementation, the history storage can be arranged such that, as each new item of history data is added, an oldest item of history data within the shift register is discarded, such that the shift register maintains the p most recent items of history data. Hence, in such an arrangement the shift register can effectively maintain a sliding window of history information, where the amount of history data maintained is dependent on the number of entries provided by the shift register. This means that at any point in time following initial population of the entries in the shift register, the amount of history information maintained is the same, which can simplify the analysis performed by the history analysis circuitry to determine whether the ratio is outside of an acceptable range. However, in an alternative arrangement, a different form of history storage could be maintained that allowed the amount of history information to increase over time, and the history analysis circuitry would then need to take into account the total amount of history information maintained within the storage when performing the ratio analysis.

In implementations where the history storage is formed by a shift register, then the shift register can be organised in a variety of ways. In one particular implementation, the shift register is a serial-in-parallel-out shift register, and the history analysis circuitry is connected to an output of the shift register so as to receive p items of history data in response to the analysis trigger. Hence, in such an arrangement, the history analysis circuitry can obtain all of the items of history data in parallel from the shift register, improving the performance of the ratio analysis operation.

The way in which the input of the shift register is coupled to the first signal and second signal information can take a variety of forms. For example, a multiplexing arrangement may be provided so that either the first signal or the second signal could be provided to the input of the shift register at any point in time, for example dependent on whether the first signal is asserted or the second signal is asserted. However, in one particular example implementation, a significant simplification can be achieved by merely arranging for the input of the shift register to be coupled to the first signal. Then, on occurrence of the update trigger the new item of history data added to the head entry in the shift register is indicative of a current value of the first signal.

In one example implementation, the first signal may either have a logic 1 or a logic 0 value, dependent on whether it is asserted or not. For example, the logic 1 value may indicate that the first signal is asserted while the logic 0 value may indicate that the first signal is deasserted. In situations where the first signal is asserted, and that triggers the update to the shift register, a logic 1 value can in that instance be written into the head entry of the shift register to identify assertion of the first signal. In contrast, if the second signal is asserted but the first signal is not, then this can cause a logic 0 value (i.e. the value of the unasserted first signal) to be stored into the head entry of the shift register during an update operation that is triggered due to assertion of the second signal. In such an arrangement, the logic 0 value in an entry of the shift register will be interpreted as indicating an instance of assertion of the second signal.

In such an arrangement, the update circuitry may be arranged to issue the update trigger when one of the first signal is asserted or the second signal is asserted, but to omit the update trigger when the first signal and the second signal are simultaneously asserted. As mentioned earlier, whilst this might in principle lead to some loss of information, this can be largely mitigated in most practical situations by appropriate choice of m and n, hence enabling a significant simplification to the circuitry by requiring only the first signal to be connected to the input of the shift register.

In one example arrangement, each item of history data stores a first value to indicate assertion of the first signal and a second value to indicate assertion of the second signal, and the history analysis circuitry comprises threshold indication storage to identify threshold information used to determine when the ratio is outside of the acceptable range by reference to the values stored in the entries of the history storage.

The threshold information could take a variety of forms. For example, it could specify separate thresholds for the first value and the second value. However, in instances where there are a predetermined, fixed, number of entries in the history storage, such as in the earlier-discussed shift register example, then threshold information can be provided merely by using a single threshold value, for example to identify the number of occurrences of the first value within the entries of the history storage.

In one example implementation, the apparatus further comprises exception signal generation circuitry arranged to assert an exception signal to an interrupt controller of the data processing system in dependence on whether the report signal is asserted. The exception signal generation circuitry could, for example, be arranged to assert the exception signal whenever the report signal is asserted. However, alternatively it may take into account a number of other signals when deciding whether to assert the exception signal in the presence of the asserted report signal. This could for example involve reference to one or more signals indicative of the number of occurrences of other events if desired. Alternatively, or in addition, a qualification signal may also be provided to the exception signal generation circuitry, and that qualification signal may need to be asserted before an exception signal will be asserted in the presence of the asserted report signal.

In particular, in one example arrangement the apparatus further comprises warmup qualification circuitry used to suppress generation of the exception signal based on the report signal, until a determined number of updates have been made to the event history information maintained by the history maintenance circuitry. Such an approach can hence ensure that no exceptions are triggered during the early stages of population of the history storage. Hence, in that instance it does not matter what value each entry in the storage is initialised to, since by appropriate setup of the warmup qualification circuitry it can be ensured that no exception signals will be generated until at least all of the entries have been actively updated based on assertion of the first and second signals.

The warmup qualification circuitry can be organised in a variety of ways, but in one example comprises update counter storage to maintain an update count value indicative of the number of updates that have been made to the event history information, and is arranged to assert a qualification signal when the number of updates reaches a qualification threshold value. The exception signal generation circuitry is then arranged to assert the exception signal when both the report signal and the qualification signal are asserted. Hence, through appropriate specification of the qualification threshold value, it can be ensured that a predetermined minimum number of updates occur in respect of the history storage before any reliance is made on an asserted report signal to generate an asserted exception signal.

The first and second event monitoring circuits can be organised in a variety of ways. In one simple implementation, m and n may both be set to 1, so that the first and second signals are asserted each time the first and second events occur. However, in an alternative arrangement, m and/or n may be chosen to be integers greater than 1.

For example, in one example implementation, m is greater than 1, and the first event monitoring circuitry comprises first event counter storage to maintain a first event count value indicating a number of occurrences of the first event observed since a reset event, and is arranged to assert the first signal when the number of occurrences reaches the value m, whereafter the reset event is triggered to reset the first event count value to an initial value. Similarly, in one example arrangement, n is greater than 1, and the second event monitoring circuitry comprises second event counter storage to maintain a second event count value indicating a number of occurrences of the second event observed since a reset event, and is arranged to assert the second signal when the number of occurrences reaches the value n, whereafter the reset event is triggered to reset the second event count value to an initial value.

By using larger values of m and n this can increase the effective amount of history information maintained within the history storage, since each item of history data can be associated with assertion of either the first signal or the second signal, and the first and second signals will only be asserted after a certain multiple occurrences of the first or second event, respectively, have been observed. The threshold information maintained in association with the history analysis circuitry can then be adapted to take into account the values of m and n used by the first and second event monitoring circuits, so as to ensure that the reporting condition will be detected when the ratio between the occurrences of the first event and the occurrences of the second event is outside of the desired range.

The values of m and n can be maintained in a variety of ways, but in one example implementation the apparatus has configurable threshold storage to maintain an indication of the values of m and n. This hence enables the value of m and n to be adjusted as desired.

Particular examples will now be described with reference to the Figures.

FIG. 1 shows a data processing system 2 having a processor 4 for performing data processing, a cache 6 for storing data for processing by the processor 4, and a memory 8. The system 2 also has a translation lookaside buffer (TLB) 10 for storing virtual-to-physical address translation data for mapping virtual addresses used by the processor 4 to physical addresses used by the memory 8, and a branch predictor 12 for predicting whether branch instructions are taken or not taken. The arrangement shown in FIG. 1 is an example and it will be appreciated that the system 2 may also comprise other elements not shown in FIG. 1, or indeed some example systems may not include all of the components shown in FIG. 1.

The system 2 comprises a performance monitoring unit 20 for generating performance monitoring data indicative of processing performance of the data processing system 2. The performance monitoring unit 20 receives event signals 22 from the other elements 4, 6, 8, 10, 12 of the data processing system 2, with each signal 22 indicating the occurrence of a corresponding event. For example, an event signal 22 may be received from the processor 4 indicating the elapse of a processing cycle or the execution of an instruction, or an event signal may be received from the cache 6 or TLB 10 indicating a cache or TLB access or miss. Event signals 22 may also be received from memory 8 indicating a memory access, or from branch predictor 12 indicating a branch prediction or a branch misprediction. It will be appreciated that these examples are not exhaustive and the performance monitoring unit 20 may also receive signals indicating many other kinds of event. In response to the signals 22, the performance monitoring unit 20 generates performance monitoring data. The performance monitoring data may be captured and analysed later to determine the performance of the system 2.

The system 2 also includes an interrupt controller 30 for generating interrupt signals. In response to an interrupt signal, the processor 4 interrupts its current processing and executes an interrupt handling routine corresponding to the interrupt signal. Many different interrupt signals may be generated for different purposes, for example to trigger the processor to execute a particular task or to signal an error. One type of interrupt signal is a performance monitoring interrupt signal which is generated by the interrupt controller 30 in response to the performance monitoring data generated by the performance monitoring unit 20. Hence, if the performance monitoring data indicates a particular performance condition, then the interrupt controller 30 may interrupt the processing of the processor 4 and trigger the processor 4 to perform a predetermined operation associated with the detected performance condition.

Figure 2:
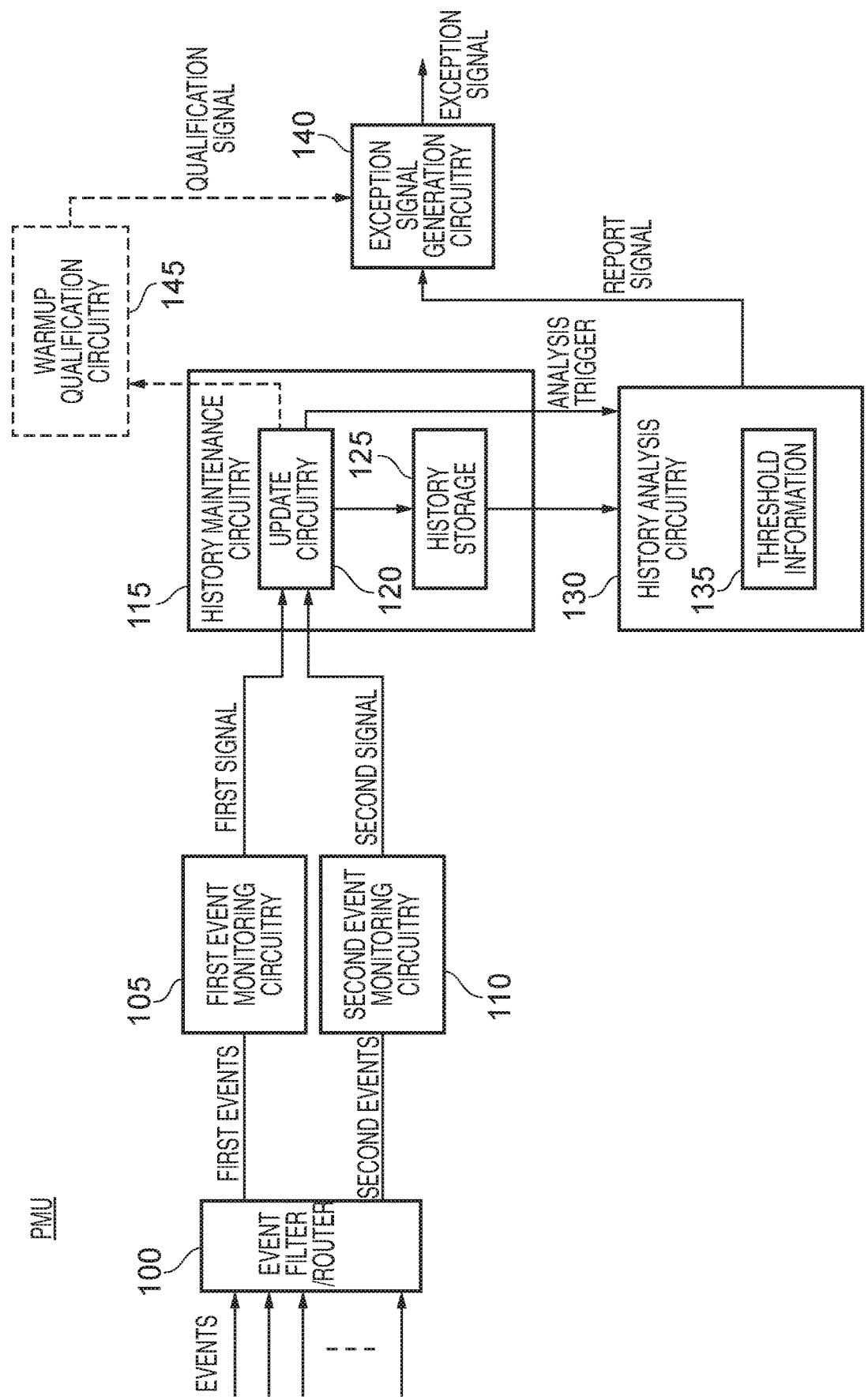
FIG. 2 is a block diagram illustrating components provided within the performance management unit of FIG. 1 in accordance with one example.

FIG. 2 is a block diagram illustrating components provided within the performance monitoring unit (PMU) 20 of FIG. 1 in accordance with one example. Events from various components within the data processing system are received by the event filter/router component 100, which can determine whether the PMU is currently setup to monitor each such event, and can then route each event being monitored to the appropriate event monitoring circuit. In this example, the first and second event monitoring circuits 105, 110 are provided to monitor occurrences of a first event and occurrences of a second event, respectively. In particular, the circuitry illustrated in FIG. 2 is used to monitor the ratio of occurrences of the first event to occurrences of the second event. The PMU may be arranged to only monitor these two events, or alternatively may have additional circuits (not shown), for monitoring occurrences of further events within the system.

The first event monitoring circuitry 105 is arranged to assert a first signal to indicate every m-th occurrence of the first event, and similarly the second event monitoring circuitry is arranged to assert a second signal to indicate every n-th occurrence of the second event. The values of m and n may be fixed, or alternatively may be configurable, through the provision of appropriate storage elements to hold the values of m and n. Further, m can be any integer value of one or more, and similarly n can be any integer value of one or more. It will be appreciated that when either m or n are set equal to 1, then the corresponding event monitoring circuit will assert a signal for every occurrence of the associated event. However, in the examples discussed hereafter, it will be assumed that both m and n are plural integer values, so that the first and second signals are not asserted on occurrence of each first or second event, respectively, but instead are asserted only on occurrence of certain multiples of the first event or the second event, respectively. This can increase the amount of history information that may be maintained within the system.

As shown in FIG. 2, the asserted first and second signals from the first and second event monitoring circuits 105, 110 are routed to history maintenance circuitry 115 that provides history storage 125 having a plurality of entries, where each entry can be used to store an item of history data. In the examples discussed herein, each item of history data indicates an assertion of the first signal or an assertion of the second signal.

Update circuitry 120 within the history maintenance circuitry 115 is arranged to analyse the received first and second signals, and determine when to update the contents of the history storage 125. In one implementation, the update circuitry may be arranged to update the history storage each time the first signal or the second signal is asserted. However, in a particular example implementation to be discussed later with reference to FIGS. 3 and 4, a significant simplification in the apparatus can be achieved by excluding updates to the history storage when both the first and second signals are asserted at the same time.

The update circuitry 120 may directly identify to the history storage 125 each new item of history data to be stored within the history storage, or alternatively the history storage may derive that information directly from the first signal and/or the second signal, with the update circuitry 120 merely issuing a trigger signal to the history storage 125 to identify when the history storage contents should be updated.

The history storage can take a variety of forms. For example, it may be arranged in such a way that the total amount of history information maintained increases over time as new instances of assertion of the first and second signals occur. However, in a particular implementation discussed hereafter with reference to FIGS. 3 and 4, the history storage comprises a predetermined number of entries, such that the amount of history information maintained at any particular point in time is constant. This can simplify the analysis of the history information performed by the history analysis circuitry 130. In one example implementation the history storage 125 is formed by a shift register, so that each new item of history data is added at a head position within the shift register, whilst at the same time an oldest item of history information is discarded.

The update circuitry 120 is also arranged to issue an analysis trigger to the history analysis circuitry 130 to cause the history analysis circuitry to analyse the current contents of the history storage. The analysis trigger can be generated in a variety of ways, but in one example the analysis trigger is sent to the history analysis circuitry 130 each time the history storage is updated, thus allowing a continuous monitoring of the ratio between occurrences of the first and second events, ensuring that that ratio can be reassessed each time information is generated that may affect the ratio.

The history analysis circuitry 130 has access to threshold information 135 that is used to determine, with reference to the values stored in the entries of the history storage 125, when the ratio is outside of an acceptable range. In one implementation, an item of history information has a first value to indicate assertion of the first signal and has a second value to indicate assertion of the second signal. The threshold information can take a variety of forms, and could for example specify separate thresholds for the first value and the second value. Further, the threshold information may be specified in fractional or integer form. However, in one particular instance where the total number of entries within the history storage is fixed, then the threshold information can be provided merely by using a single threshold value, for example to identify the number of occurrences of the first value within the entries of the history storage 125 that will be considered to indicate that the ratio has exceeded the acceptable range.

Once, in response to the analysis trigger, the history analysis circuitry 130 determines that the ratio has exceeded the allowable range, then it asserts a report signal to the exception signal generation circuitry 140. The exception signal generation circuitry 140 may be arranged to directly assert an exception signal to the interrupt controller 30 in such a situation, or alternatively may take one or more other signals into account when deciding whether to assert the exception signal in the presence of an asserted report signal.

For example, the exception signal generation circuitry 140 may also receive signals from other components within the PMU indicative of thresholds being reached in respect of other event counts, and may use that information in combination with the asserted report signal to determine when to generate the exception signal.

Alternatively, the report signal may be used directly to generate the exception signal, but the generation of the exception signal may be qualified by a qualification signal, as indicated by the components with dashed lines in FIG. 2. In particular, warmup qualification circuitry 145 may be provided that receives information from the update circuitry 120 used to identify the number of updates made to the history storage 125 since a reset event. Based on this information, the warmup qualification circuitry 145 may be arranged to assert a qualification signal once a certain warmup period has elapsed. The warmup period can for example be equated with a number of updates made to the history storage 125. Such an approach can ensure, for example, that the qualification signal is not asserted until a certain number of updates have been made to the history storage, for example a number of updates at least sufficient to ensure that every entry in the history storage has been populated directly based on asserted first and/or second signals received by the history maintenance circuitry. Hence, it does not matter what values the entries in the history storage are initialised to, since the use of a qualification signal will ensure that the exception signal generation circuitry does not act in dependence on any asserted report signals until the warmup period has elapsed.

In one example implementation, whenever the report signal is asserted in the presence of an asserted qualification signal, then the exception signal generation circuitry 140 will assert an exception signal to the interrupt controller 30, which as discussed earlier may then cause the interrupt controller to interrupt the processing performed by the CPU 4, in order to cause the CPU 4 to perform a predetermined operation that is associated with the detected performance condition. For example, such a predetermined operation may enable dynamic system configuration changes to be made to the system to better match an application's runtime behaviour, for example by increasing processor frequency. As another example, as will be discussed later herein with reference to FIGS. 10 and 11, such predetermined operations triggered by the interrupt controller may cause an evaluation to be made as to whether to switch between different algorithms used to perform a particular process within the data processing system.

Figure 3:
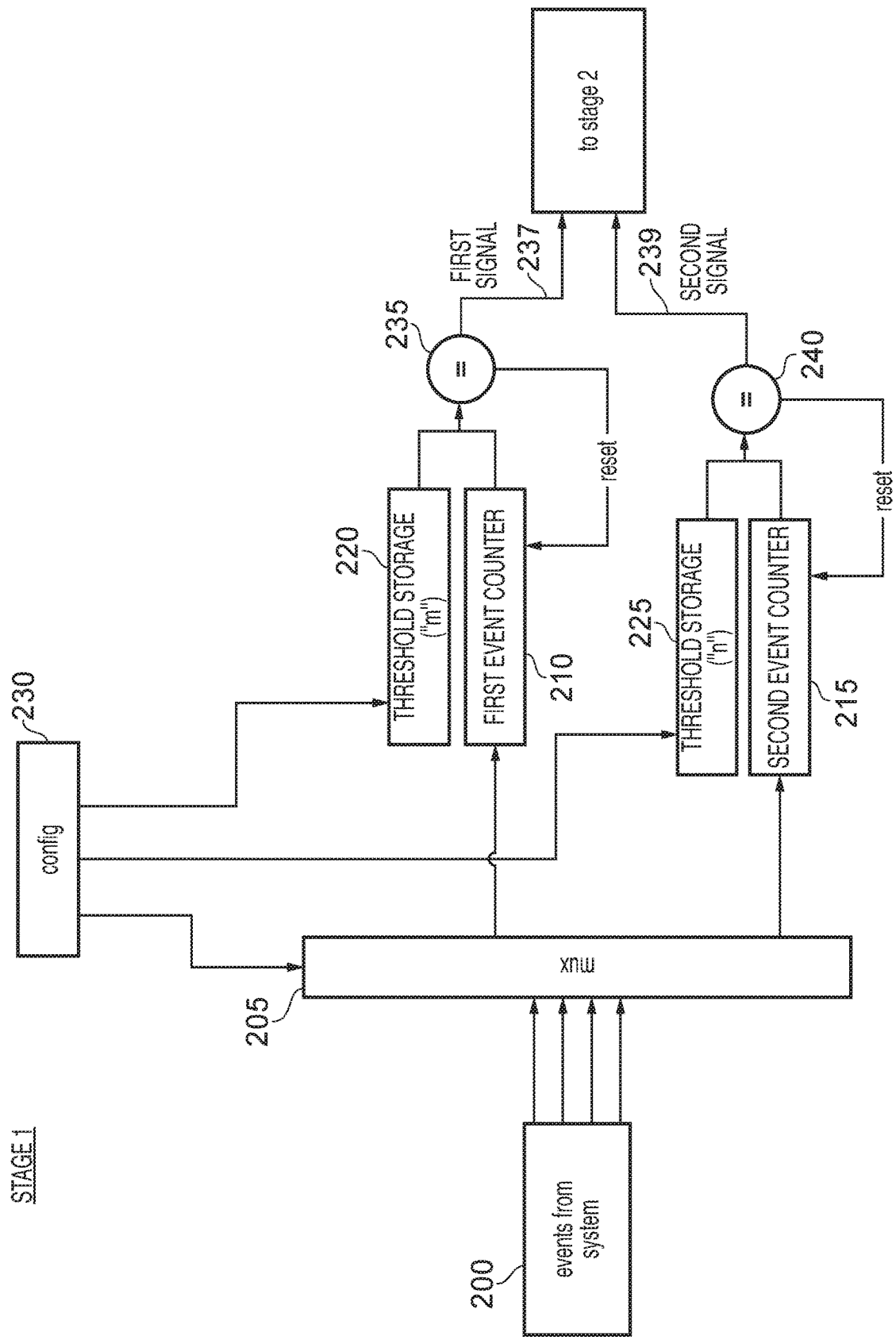
FIGS. 3 and 4 illustrate the components provided within the performance management unit of FIG. 2 in accordance with one particular example implementation.
Figure 4:
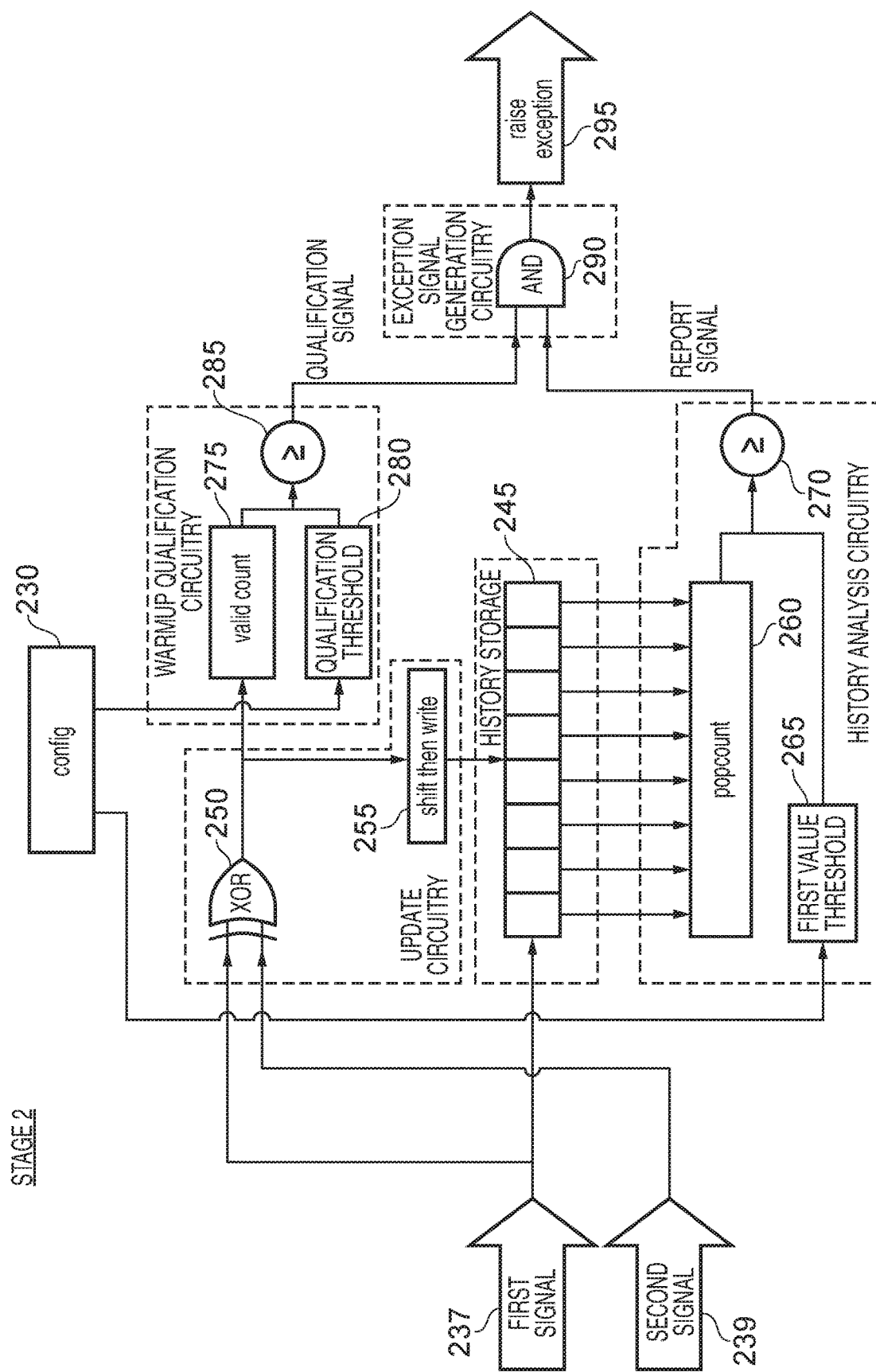

FIGS. 3 and 4 illustrate a particular example implementation of the apparatus of FIG. 2. The process performed by the PMU can conceptually be broken down into two stages, with stage one being shown in FIG. 3 and stage two being shown in FIG. 4.

As shown in FIG. 3, the events from within the system 200 are received by a multiplexing component 205 which implements the functionality of the event filter/router 100 of FIG. 2, and whose operation can be controlled by configuration block 230. In particular, the configuration block allows particular hardware counters within the PMU to be configured to maintain counts for particular events, and hence, by appropriate configuration within the configuration block 230, the event counter 210 can be set up as a counter for first events and the event counter 215 can be set up as a counter for second events, with the multiplexing component 205 being configured so as to route each occurrence of the first event to the first event counter 210 and each occurrence of the second event to the second event counter 215. As will be apparent from the earlier discussions, the events can take a wide variety of forms, relating to actions taking place within a variety of different components within the system, and for the purposes of the techniques described herein it is immaterial which events are tracked. However, in the examples illustrated herein, it is assumed that it is desired to monitor the ratio of occurrences of the first event to occurrences of the second event.

The first event monitoring circuitry 105 of FIG. 2 is implemented by the components 210, 220 and 235 in FIG. 3, whilst the second event monitoring circuitry 110 is implemented by the components 215, 225 and 240 in FIG. 3. In particular, the configuration block 230 can be used to set the values of m and n within the threshold storage elements 220, 225. As discussed earlier, these values could be set to 1, but in the examples discussed hereafter it will be assumed that both m and n are plural integer numbers.

As illustrated in FIG. 3, the contents of the first event counter 210 and the threshold storage 220 are provided to the comparison circuitry 235. When the comparison circuitry 235 detects that the first event counter has reached the value m, then the first signal is asserted over path 237, and then on a subsequent clock cycle the first event counter is reset to an initial value, for example to 0.

Similarly, the comparator 240 compares the count value held within the second event counter 210 and the threshold value n within the storage element 225, and asserts the second signal when the second event counter has reached n, whereafter on a subsequent clock cycle the second event counter is reset.

Figure 5:
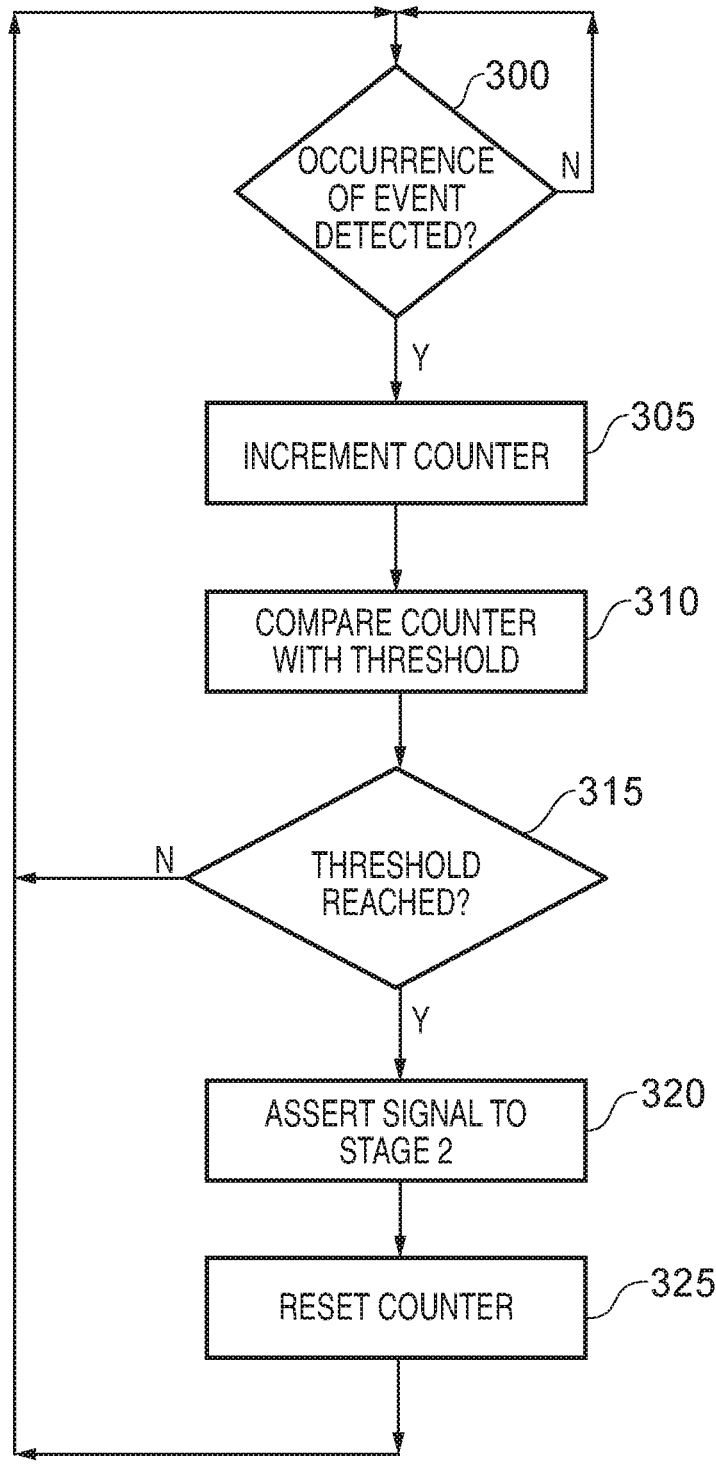
FIG. 5 is a flow diagram illustrating the operation of the event monitoring circuits of FIG. 2 in accordance with one example implementation.

FIG. 5 is a flow diagram illustrating the operation of each of the event monitoring circuits. At step 300, occurrence of an event is awaited, this being indicated by the signals propagated to the relevant event counter 210, 215 from the multiplexing block 205. Once an occurrence of an event is detected, then the counter within the event counter element 210, 215 is incremented at step 305, whereafter that counter value is compared with the threshold value using the comparison components 235, 240. As a result of that comparison, it is then determined at step 315 whether the threshold level has been reached.

If not, then the process returns to step 300 to await another occurrence of the event. However, once the threshold has been reached, then the associated signal is asserted to stage two, whereafter at step 325 the counter is reset, and the process then returns to step 300.

The first and second signals 237, 239 are forwarded to stage 2 shown in FIG. 4. In the example shown in FIGS. 3 and 4, it is assumed that a logic 0 value of the signal indicates an unasserted state and a logic 1 value indicates an asserted state. However, it will be appreciated that this is a matter of design choice and by appropriate adjustment to the components shown in FIG. 4, it would be possible for the values associated with the unasserted and asserted states to be flipped.

As shown in FIG. 4, the update circuitry of the history maintenance circuitry is in this example formed by an XOR gate 250, that is used to control a shift then write component 255. Accordingly, it will be appreciated that whenever the first signal is asserted or the second signal is asserted, a logic 1 value is issued to the shift then write component 255 to trigger an update to the history storage. However, when neither the first signal nor the second signal is asserted, or if both signals are asserted at the same time, then a logic 0 value is output from the XOR gate 250 and no update is performed. This approach is taken in the specific implementation of FIG. 4, since it allows a significant simplification in the history storage. In particular, as shown, the history storage can be fed directly by only one of the signals 237, 239, in the example illustrated the first signal 237 being used for this purpose. When the first signal is asserted it will have a logic 1 value and when the first signal is unasserted it will have a logic 0 value. Accordingly, when the update to the history storage is triggered by assertion of the first signal, this will cause a logic 1 value to be written into the history storage, whereas if the update operation is triggered by assertion of the second signal, this will cause a logic 0 value to be added to the history storage, since due to the earlier discussed operation of the XOR gate 250, an update based on assertion of the second signal will only occur when the first signal is unasserted.

The history storage can take a variety of forms, but in one implementation is a p-bit shift register 245, with each new item of history data being inserted in a head position in the shift register, whilst at the same time the oldest item of history data is discarded from the tail entry of the shift register. As per the example shown in FIG. 4, the shift register is arranged as a serial-in-parallel-out shift register, so that all of the p-items of history data can be provided in parallel to the history analysis circuitry when the analysis trigger is used to cause the history analysis circuitry to analyse the history information held within the history storage.

Figure 6:
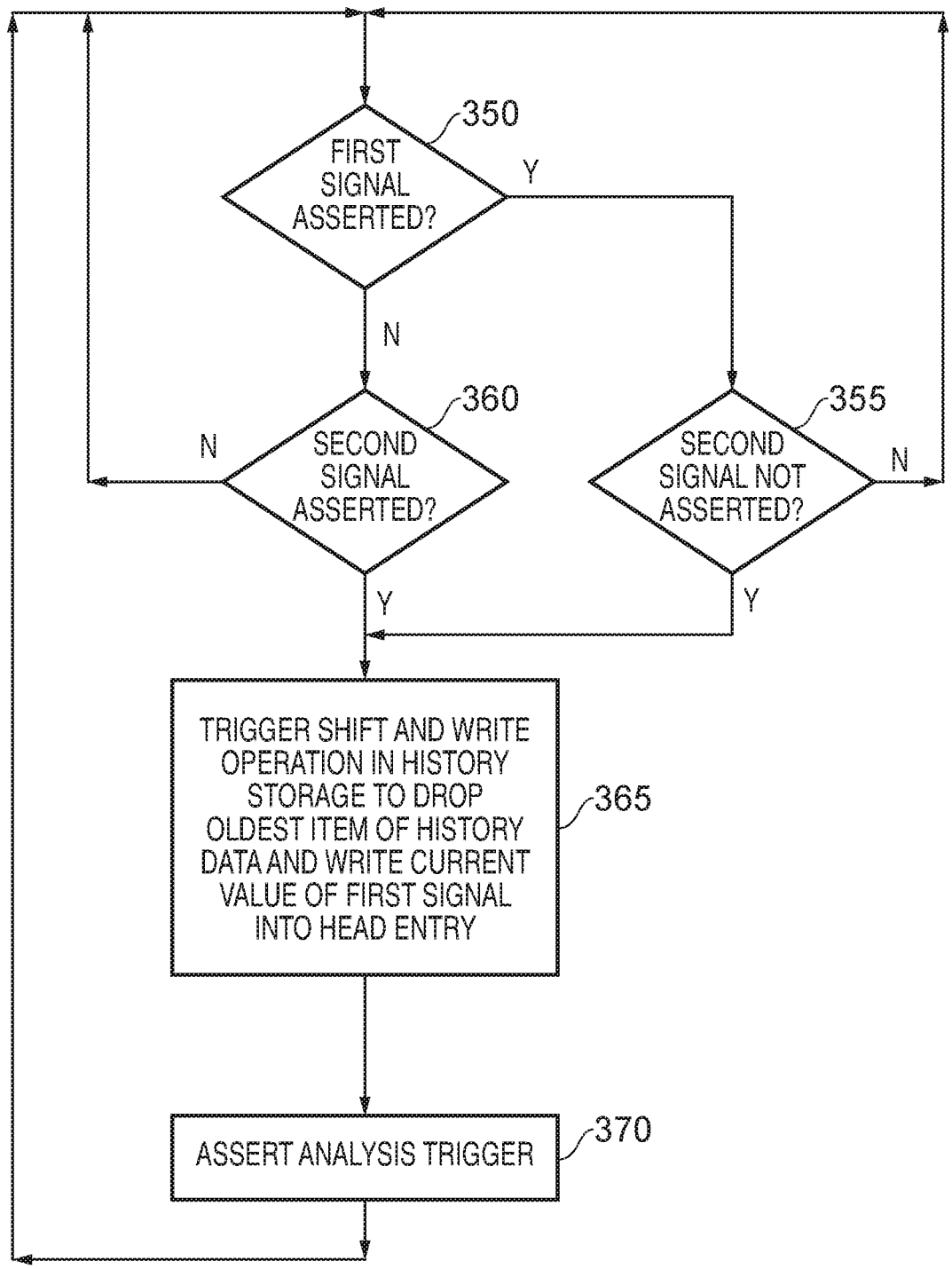
FIG. 6 is a flow diagram illustrating the operation of the history maintenance circuitry in accordance with one example implementation.

The operation of the history maintenance circuitry is illustrated by the flow diagram in FIG. 6. At step 350, it is determined whether the first signal has been asserted, and if so it is then checked at step 355 that the second signal is not asserted. If this is the case, then the process proceeds to step 365 where the shift and write operation is triggered in the history storage in order to perform a shift operation on the register that causes the oldest item of history data to be dropped from the history storage, and to write the current value of the first signal into the head entry of the history storage. Thereafter, the analysis trigger is asserted at step 370, to cause the history analysis circuitry to analyse the current contents of the history storage.

As shown in FIG. 6, if the first signal is not asserted, it is determined at step 360 whether the second signal is asserted, and if so the process also proceeds to steps 365, 370. However, if neither the first signal is asserted nor the second signal is asserted, then no action is taken and the process returns to step 350 to analyse the first and second signals in the next clock cycle. Similarly, if the first signal is asserted and the second signal is also asserted in a particular clock cycle, no action is taken, and instead the process loops back to step 350 to re-evaluate the signals on the next clock cycle.

As shown in FIG. 4, the history analysis circuitry incorporates a popcount circuit 260 that is responsive to the analysis trigger to read the contents of each of the entries of the shift register, and to count the total number of entries storing a predetermined value, in this particular example a logic 1 value. As discussed earlier, an entry storing a logic 1 value will be associated with assertion of the first signal, whilst an entry storing a logic 0 value will be associated with assertion of the second signal, and hence by counting the number of logic 1 values within the shift register contents, this indicates the number of times that the first signal has been asserted within the history window maintained by the shift register contents. A first value threshold register 265 is then provided whose value can be set by the configuration block 230, and the comparison circuitry 270 determines whether the value detected by the popcount circuitry is greater than or equal to the first threshold value in the storage element 265. If so, this is deemed to indicate a situation where the ratio of occurrences of the first event to occurrences of the second event is outside of an acceptable range, and accordingly a report signal is asserted to the exception signal generation circuitry.

It will be appreciated that the first value threshold stored within the storage element 265 can be set so as to take into account the values of m and n, and hence the frequency with which the first signal and second signal are asserted based on occurrences of the first and second events, respectively.

Figure 7:
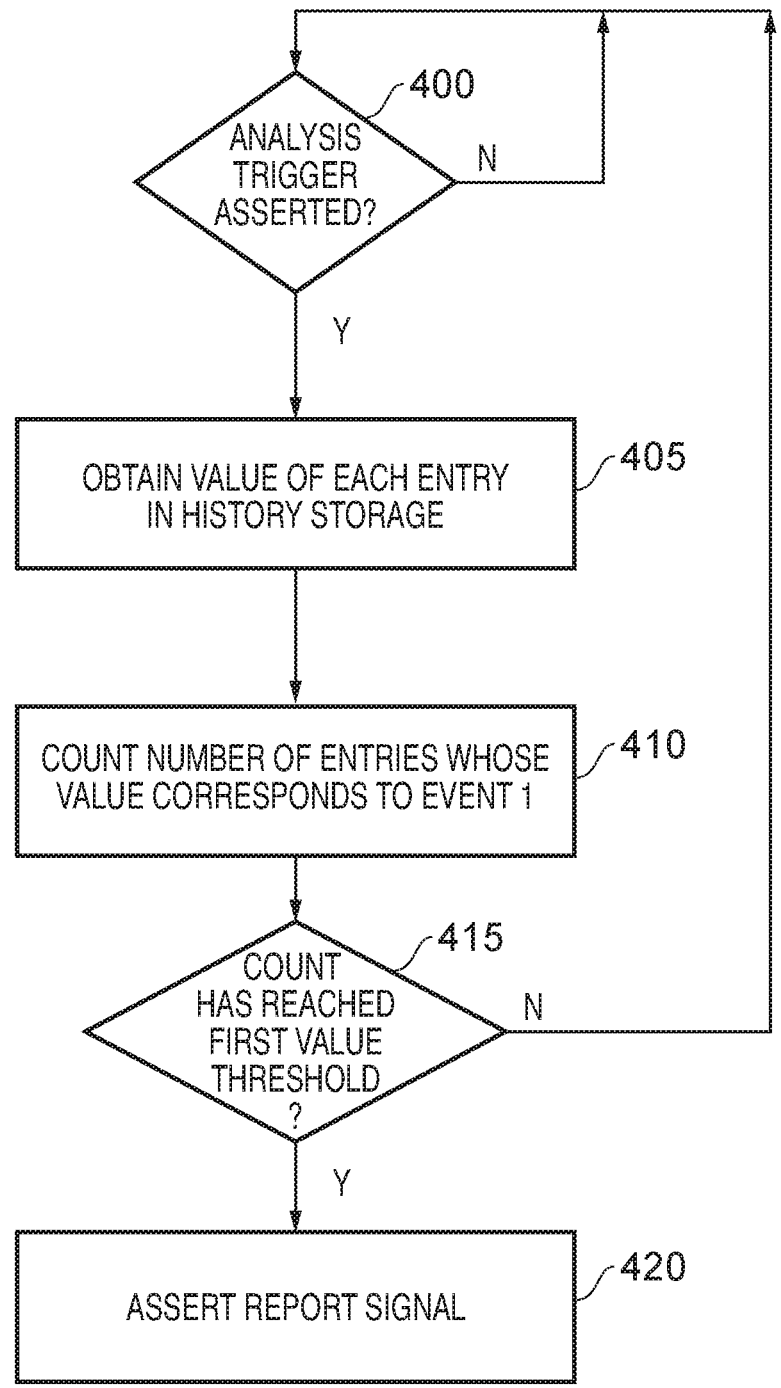
FIG. 7 is a flow diagram illustrating the operation of the history analysis circuitry in accordance with one example implementation.

FIG. 7 is a flow diagram illustrating the operation of the history analysis circuitry of FIG. 4. At step 400 it is determined whether an analysis trigger has been asserted. As discussed earlier, in one implementation the analysis trigger is asserted each time an update is performed in the history storage, and hence can be derived directly from the output of the shift then write circuitry 255.

Once the analysis trigger is asserted, then the value of each entry in the history storage is obtained by the popcount circuitry 260, in the implementation of FIG. 4 these values being obtained in parallel from the output interface of the shift register. At step 410, the number of entries whose value corresponds to event 1 is then counted, whereafter at step 415 it is determined whether the count value has reached the first threshold value, using the comparison circuitry 270. If not, then no further action is taken and the report signal remains unasserted, with the process returning to step 400 to await receipt of the next analysis trigger. However, if the count value has reached the first value threshold, then the report signal is asserted at step 420.

As discussed earlier, exception signal generation circuitry may be arranged to assert an exception signal over path 295 whenever the report signal is asserted. However, in the particular example illustrated in FIG. 4 the actions of the exception signal generation circuitry are qualified by a qualification signal received from the warmup qualification circuitry, which as shown in FIG. 4 consists in that example of a valid count block 275, a qualification threshold storage 280 and a comparison circuit 285.

As shown in FIG. 4, each time a logic 1 value is asserted by the XOR gate 250, the count within the valid count block 275 is incremented. Hence, it will be appreciated that the valid count block 275 maintains a count of the number of updates that have been performed to the history storage since a reset event.

Under control of the configuration block 230, a qualification threshold can be stored within the storage element 280, with both the qualification threshold and the current valid count value being routed to the comparison circuitry 285. The comparison circuitry 285 is arranged to only assert the qualification signal once the valid count is greater than or equal to the qualification threshold stored within the storage element 280. By appropriate choice of the qualification threshold, it will thereby be understood that a warmup period can be specified so that the exception signal generation circuitry will not raise an exception irrespective of the value of the report signal until a certain number of updates have been made to the history storage. For example, the threshold can be set so that at least every entry in the history storage needs to be written to in response to assertion of the first signal or the second signal, before the qualification signal is asserted.

Figure 8:
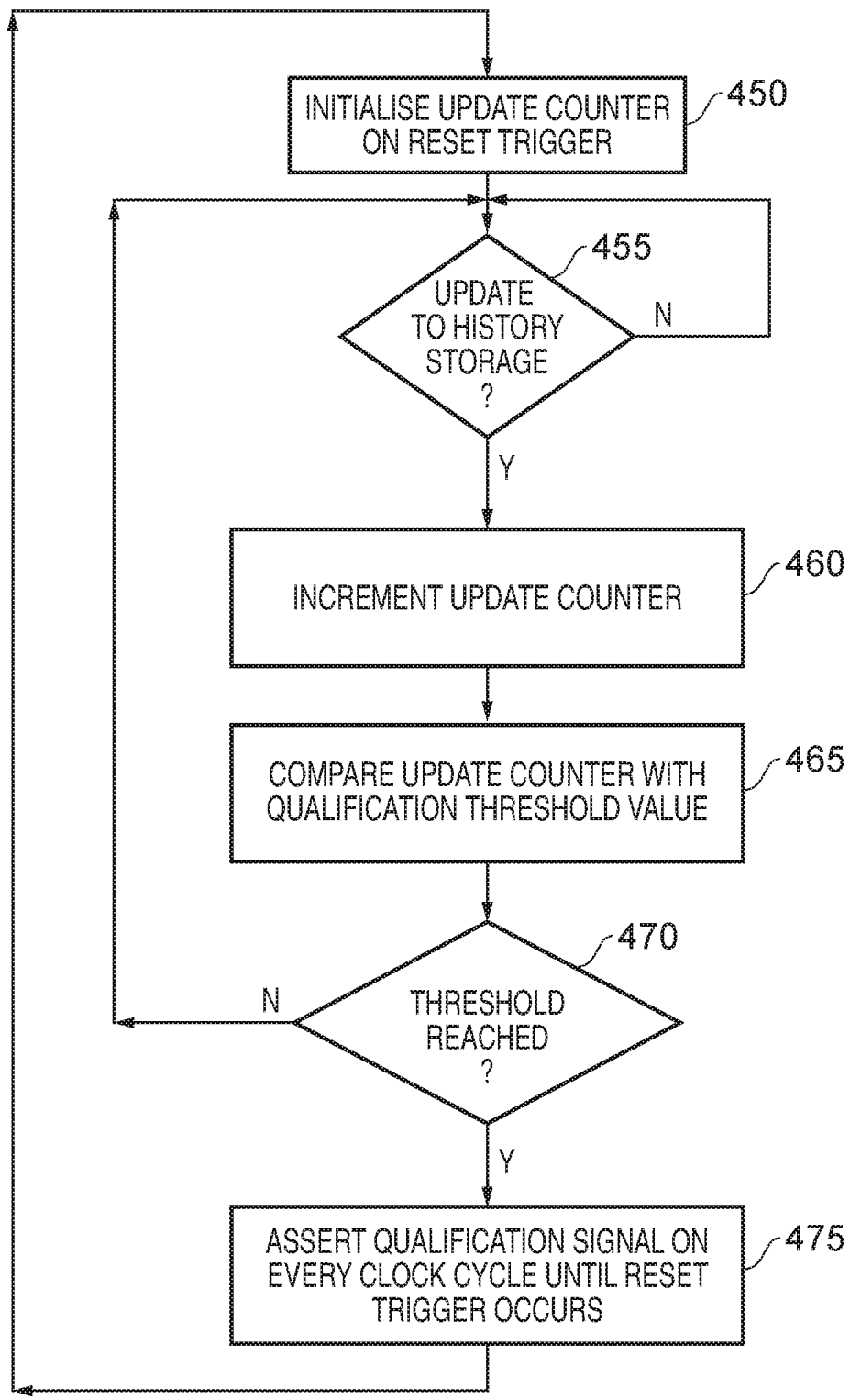
FIG. 8 is a flow diagram illustrating the operation of the warmup qualification circuitry in accordance with one example implementation.

FIG. 8 is a flow diagram illustrating the operation of the warmup qualification circuitry. At step 450, the valid count block 275 (also referred to herein as the update counter) is initialised on a reset trigger. The reset trigger could take a variety of forms. For example, the reset trigger may arise on resetting of the PMU, or could occur in other situations, even when the PMU itself is not reset.

Following resetting of the update counter, then the process proceeds to step 455 where it is determined whether an update is being made to the history storage, as discussed earlier this being indicated by the output of the XOR gate 250 in the example of FIG. 4. Whenever the history storage is updated, then the update counter 275 is incremented at step 460. Thereafter, at step 465, the update counter value is compared with the qualification threshold value, whereafter it is determined whether that qualification threshold has been reached at step 470.

If not, then the process returns to step 455 to await the next update to the history storage. However, once the threshold has been reached, then the qualification signal is asserted at step 475 on every clock cycle until the reset trigger occurs, with the process then returning to step 450.

Figure 9:
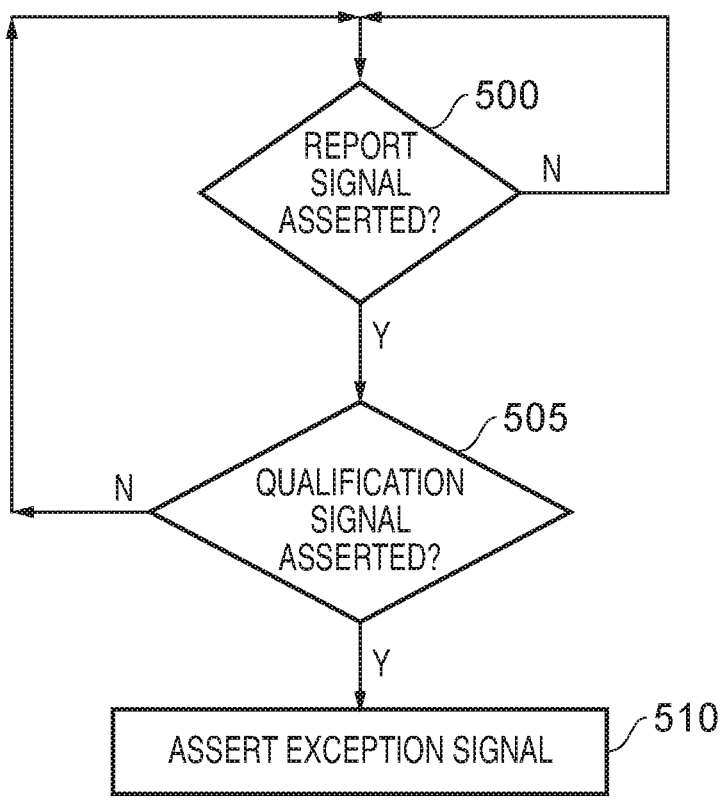
FIG. 9 is a flow diagram illustrating the operation of the exception signal generation circuitry in accordance with one example implementation.

FIG. 9 illustrates the operation of the exception signal generation circuitry in the example of FIG. 4, as shown in FIG. 4 this component being implemented by an AND gate 290. At step 500, it is determined whether the report signal is asserted, and if not no action is taken. However, when the report signal is asserted, it is determined whether the qualification signal is asserted, and if not again no action is taken. However, if at step 505 it is determined that the qualification signal is asserted, then at step 510 the exception signal generation circuitry asserts an exception signal to the interrupt controller 30.

It will be appreciated that the performance monitoring unit arrangement described with reference to the earlier figures can be used in a wide variety of situations, to monitor ratios between various different events. It will further be appreciated that the PMU is not necessarily restricted to only monitoring a single ratio of events, but instead, by appropriate duplication of the circuit components, the PMU can be organised to monitor multiple ratios simultaneously.

Purely by way of example illustration, a use case will be considered where the performance monitoring information obtained through the monitoring of the ratio of the first and second events is used to determine the appropriate algorithm to use for a table join operation. In database management systems, such as those using relational databases, it is possible to implement table join operations using various different mechanisms, for example using either a sort-merge join algorithm or a hash join algorithm. Neither of these algorithms is necessarily better than the other, and the strengths and weaknesses of each algorithm is dependent on a number of factors which are not always known a priori. Hence, it may be desirable to try one of these algorithms while monitoring its performance, and hence enable switching to the alternative algorithm if its execution is suboptimal. For example, a hash join algorithm may generate many load-store alias events in the microarchitecture, whereas a sort-merge join algorithm could potentially generate many branch mispredictions.

Figure 10:
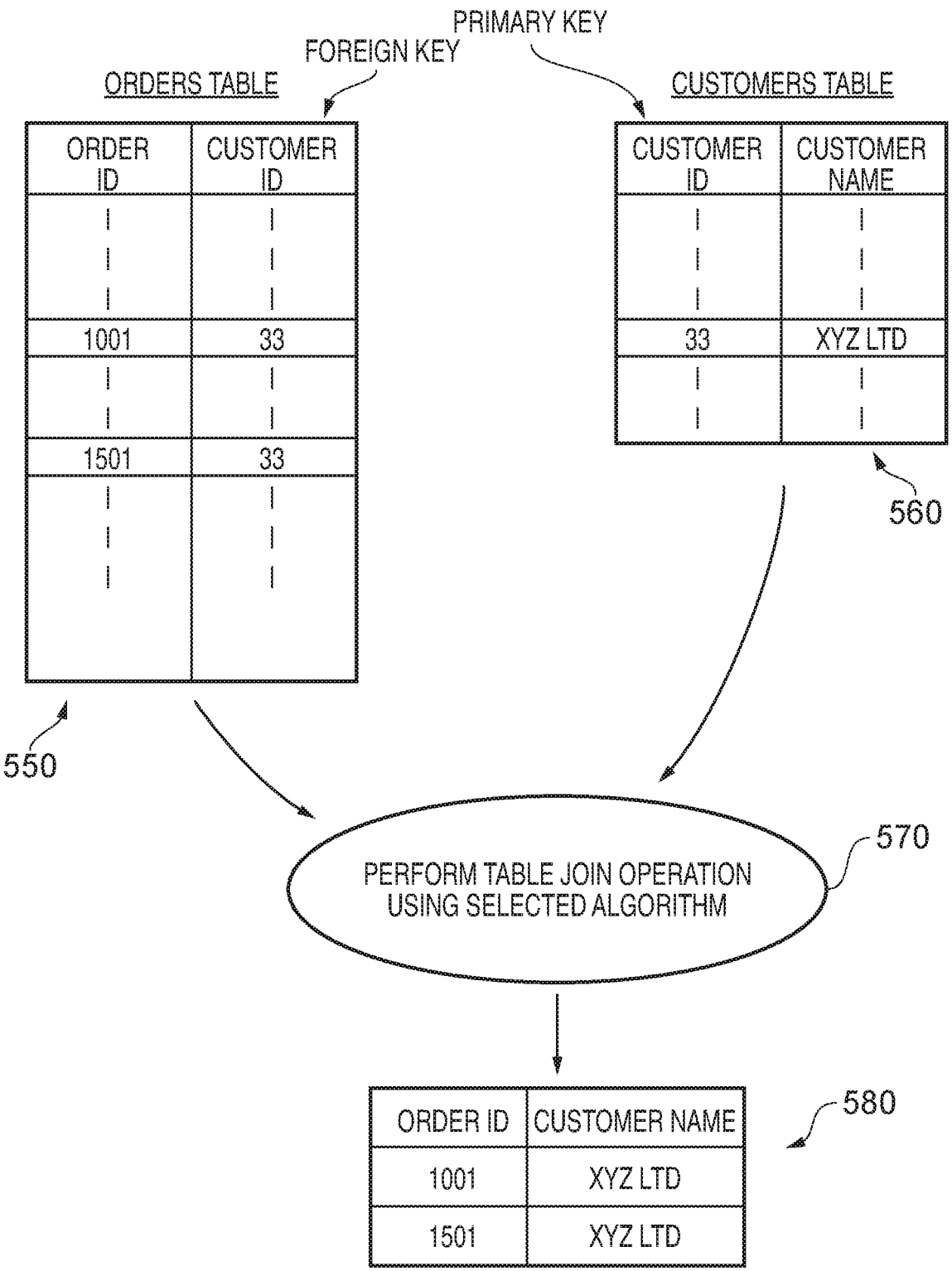
FIG. 10 illustrates a table join operation.
Figure 11:
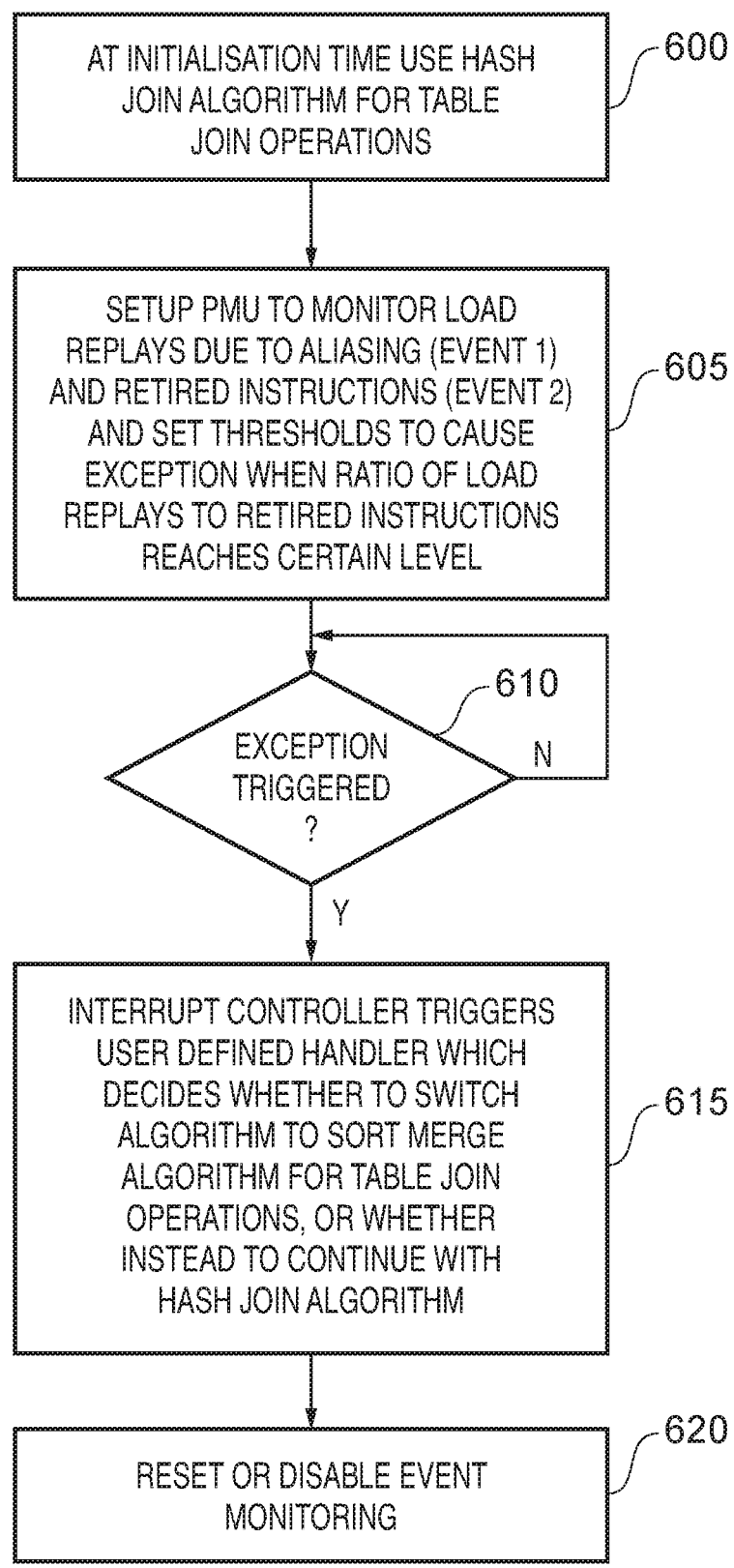
FIG. 11 is a flow diagram illustrating how the performance monitoring techniques described herein may be used to determine whether to switch between different algorithms that may be used to perform the table join operation of FIG. 10, in one example implementation.

FIG. 10 schematically illustrates a table join operation. In this example, two tables 550, 560 are maintained. The table 550 is an orders table maintaining information about order IDs and the associated customer ID for each order. In this particular example, it indicates that the customer with a customer ID of 33 has placed two orders, having order IDs 1001 and 1501. A second table 560 is a customers table and identifies the customer associated with each customer ID. In this example, it indicates that the customer having the ID 33 is XYZ Ltd.

It will be appreciated in the example of FIG. 10 that both tables provide information about the customer ID. In relational database terms, the customer ID associated with table 560 is referred to as the primary key, since each customer ID provided within the customers table will be unique, i.e. there will only be a single entry for XYZ Ltd. However, the customer ID field within the orders table 550 is referred to as the foreign key, since multiple instances of another table's primary key (in this example the customer ID) may occur within that table.

As shown schematically by the block 570, an inner table join operation can be performed using either the hash join algorithm or the sort-merge join algorithm in order to produce the resultant output table 580 identifying the orders placed by XYZ Ltd.

As mentioned earlier, it may not be known a priori which of the possible algorithms will perform better in a particular situation. Accordingly, the system could be set up so that one of the algorithms is chosen as a starting algorithm, but where the PMU 20 is used to monitor its behaviour for performance problems. Such an approach is illustrated by the flow diagram of FIG. 11. Hence, at initialisation time, the hash join algorithm could for example be chosen at step 600 to be used when performing table join operations. As mentioned earlier, the hash join algorithm may potentially generate a large number of load-store alias events.

Accordingly, at step 605, the PMU is set up to monitor load replay events due to aliasing as event 1, and retired instructions as event 2. In addition, the thresholds are set to cause an exception to be generated when the ratio of load replays to retired instructions reaches a certain level. This can be achieved through the appropriate setting of the values m, n within the storage elements 220, 225, and the first value threshold within the storage element 265. As discussed earlier, a qualification threshold can also be specified within the storage element 280 to ensure that no exceptions are generated during a warmup period.

Hence, purely by way of very specific example, the entity responsible for configuring the PMU may know that one loop of the algorithm contains 100 instructions and that there are 11 load instructions that could potentially have aliasing problems with other stores. As such, a measurement granularity of one loop iteration may be chosen with m being set equal to 11 and n being set equal to 100. Hence, the first signal will be asserted for every 11 aliasing events, and the second signal will be asserted for every 100 retired instructions.

Further, it may be understood that the first iteration of the algorithm may not be reflective of its overall behaviour due to warmup, so the qualification threshold could be set to a value large enough to ensure that no exception triggers are generated until a certain number of iterations of the algorithm have taken place, and corresponding updates have been made within the history storage. Purely by way of example, the qualification threshold could be set to 20, hence requiring at least 20 updates to the history storage before any exception signals may be generated. Finally, the user may take the view that it is not important if there are some load replays due to aliasing, but wants the system to be alerted if these are very frequent. As a particular example, with a shift register containing 8 entries, the first value threshold may then be set to three, hence meaning that if three or more of the 8 history bits are set to 1, then the report signal is asserted. For the specific example discussed above, this signifies that there must be at least 33 load replays due to aliasing occurring within a window of 500 retired instructions before an exception will be raised.

It will be appreciated that the above numbers are purely provided for the sake of illustration, and the values can be set as desired for any particular situation.

Returning to FIG. 11, at step 610, it is determined whether an exception is triggered, and if so then at step 615 the interrupt controller 30 triggers a user defined handler to be executed on the CPU 4, execution of that user defined handler determining whether to switch the algorithm to the sort-merge join algorithm for the table join operation, or whether instead to continue with the hash join algorithm. For example, if it was determined to be appropriate to switch to the sort merge algorithm, then the handler could choose to modify its return address and resteer the application's control flow in order to move to use of the sort merge algorithm. Alternatively, depending on how much work has already been performed, it may be decided that it is appropriate to continue with the hash join algorithm.

Based on the decision taken at step 615, it may also then be determined at step 620 whether to reset or disable event monitoring by the PMU following the return from the exception. For example, if at step 615 the process switches to the sort merge algorithm, it may be determined appropriate to disable event monitoring, whereas if it is determined to continue with the hash join algorithm, it may be decided appropriate to reset the event monitoring mechanism.

From the above description, it will be appreciated that the technique described herein provides a lightweight and configurable mechanism for an application to inspect how it is performing in real-time, and for any necessary corrective action to be taken. The mechanism described allows for the continuous monitoring of a ratio of interest. Further, the application is only notified when the ratio crosses a configurable threshold avoiding any unnecessary calculations to be performed in order to determine whether the ratio has been exceeded. The described mechanism hence provides a particularly efficient and effective mechanism for performing real-time performance monitoring/signalling within a data processing system.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
 first event monitoring circuitry to monitor occurrences of a first event within a data processing system, and to assert a first signal to indicate every m-th occurrence of the first event, where m is an integer of 1 or more;
 second event monitoring circuitry to monitor occurrences of a second event within the data processing system, and to assert a second signal to indicate every n-th occurrence of the second event, where n is an integer of 1 or more;
 history maintenance circuitry to maintain event history information which is updated in dependence on the asserted first and second signals; and
 history analysis circuitry responsive to an analysis trigger to analyse the event history information to detect a reporting condition when the event history information indicates that a ratio between the occurrences of the first event and the occurrences of the second event is outside an acceptable range;
 wherein the history analysis circuitry is responsive to detection of the reporting condition to assert a report signal.

2. The apparatus as claimed in claim 1, wherein the history analysis circuitry is arranged to detect that the ratio is outside the acceptable range when the event history information indicates that the ratio has reached a chosen threshold.

3. The apparatus as claimed in claim 1, wherein the analysis trigger is generated each time the event history information is updated.

4. The apparatus as claimed in claim 1, wherein the history maintenance circuitry comprises a history storage comprising a plurality of entries, where each entry is arranged to store an item of history data, and where each item of history data indicates an assertion of the first signal or an assertion of the second signal.

5. The apparatus as claimed in claim 4, wherein the history maintenance circuitry further comprises update circuitry arranged to receive the first signal and the second signal and to cause the history storage to be updated dependent on the received first and second signals.

6. The apparatus as claimed in claim 5, wherein the history storage is arranged as a shift register comprising p entries, and is responsive to an update trigger from the update circuitry to add a new item of history data to a head entry in the shift register.

7. The apparatus as claimed in claim 6, wherein as each new item of history data is added, an oldest item of history data within the shift register is discarded, such that the shift register maintains the p most recent items of history data.

8. The apparatus as claimed in claim 6, wherein the shift register is a serial-in-parallel-out shift register, and the history analysis circuitry is connected to an output of the shift register so as to receive p items of history data in response to the analysis trigger.

9. The apparatus as claimed in claim 6, wherein an input of the shift register is coupled to the first signal, such that on occurrence of the update trigger the new item of history data added to the head entry in the shift register is indicative of a current value of the first signal.

10. The apparatus as claimed in claim 9, wherein the update circuitry is arranged to issue the update trigger when one of the first signal is asserted or the second signal is asserted, but to omit the update trigger when the first signal and the second signal are simultaneously asserted.

11. The apparatus as claimed in claim 4, wherein each item of history data stores a first value to indicate assertion of the first signal and a second value to indicate assertion of the second signal, and the history analysis circuitry comprises threshold indication storage to identify threshold information used to determine when said ratio is outside of the acceptable range by reference to the values stored in the entries of the history storage.

12. The apparatus as claimed in claim 11, wherein the threshold information provides a threshold value for a number of occurrences of the first value within the entries of the history storage.

13. The apparatus as claimed in claim 1, further comprising exception signal generation circuitry arranged to assert an exception signal to an interrupt controller of the data processing system in dependence on whether the report signal is asserted.

14. The apparatus as claimed in claim 13, further comprising warmup qualification circuitry used to suppress generation of the exception signal based on the report signal, until a determined number of updates have been made to the event history information maintained by the history maintenance circuitry.

15. The apparatus as claimed in claim 14, wherein: the warmup qualification circuitry comprises update counter storage to maintain an update count value indicative of the number of updates that have been made to the event history information, and is arranged to assert a qualification signal when the number of updates reaches a qualification threshold value; and the exception signal generation circuitry is arranged to assert the exception signal when both the report signal and the qualification signal are asserted.

16. The apparatus as claimed in claim 1, wherein:
m is greater than 1; and
the first event monitoring circuitry comprises first event counter storage to maintain a first event count value indicating a number of occurrences of the first event observed since a reset event, and is arranged to assert the first signal when the number of occurrences reaches the value m, whereafter the reset event is triggered to reset the first event count value to an initial value.

17. The apparatus as claimed in claim 16, further comprising configurable threshold storage to maintain an indication of the values of m and n.

18. The apparatus as claimed in claim 1, wherein:
n is greater than 1; and
the second event monitoring circuitry comprises second event counter storage to maintain a second event count value indicating a number of occurrences of the second event observed since a reset event, and is arranged to assert the second signal when the number of occurrences reaches the value n, whereafter the reset event is triggered to reset the second event count value to an initial value.

19. A method of monitoring events in a data processing system, comprising:
monitoring occurrences of a first event within the data processing system, and asserting a first signal to indicate every m-th occurrence of the first event, where m is an integer of 1 or more;
monitoring occurrences of a second event within the data processing system, and asserting a second signal to indicate every n-th occurrence of the second event, where n is an integer of 1 or more;
employing history maintenance circuitry to maintain event history information which is updated in dependence on the asserted first and second signals;
responsive to an analysis trigger, employing history analysis circuitry to analyse the event history information to detect a reporting condition when the event history information indicates that a ratio between the occurrences of the first event and the occurrences of the second event is outside an acceptable range; and
asserting a report signal in response to detection of the reporting condition.

20. An apparatus comprising:
first event monitoring means for monitoring occurrences of a first event within a data processing system, and for asserting a first signal to indicate every m-th occurrence of the first event, where m is an integer of 1 or more;
second event monitoring means for monitoring occurrences of a second event within the data processing system, and for asserting a second signal to indicate every n-th occurrence of the second event, where n is an integer of 1 or more;
history maintenance means for maintaining event history information which is updated in dependence on the asserted first and second signals; and
history analysis means for analysing, in response to an analysis trigger, the event history information to detect a reporting condition when the event history information indicates that a ratio between the occurrences of the first event and the occurrences of the second event is outside an acceptable range;

wherein the history analysis means is responsive to detection of the reporting condition to assert a report signal.

\* \* \* \* \*